(12) United States Patent
Zhou et al.

(10) Patent No.: US 9,287,815 B2
(45) Date of Patent: Mar. 15, 2016

(54) POWER CONVERTER

(71) Applicant: DAIKIN INDUSTRIES, LTD., Osaka-shi, Osaka (JP)

(72) Inventors: Yueqiang Zhou, Shiga (JP); Toshiyuki Maeda, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 43 days.

(21) Appl. No.: 14/348,377

(22) PCT Filed: Sep. 28, 2012

(86) PCT No.: PCT/JP2012/006261
§ 371 (c)(1),
(2) Date: Mar. 28, 2014

(87) PCT Pub. No.: WO2013/046728
PCT Pub. Date: Apr. 4, 2013

(65) Prior Publication Data
US 2014/0232309 A1    Aug. 21, 2014

(30) Foreign Application Priority Data

Sep. 30, 2011   (JP) ................. 2011-216911

(51) Int. Cl.
*H02P 21/00*   (2006.01)
*H02P 27/08*   (2006.01)
*H02P 21/05*   (2006.01)
*H02P 21/06*   (2006.01)

(52) U.S. Cl.
CPC ............ *H02P 21/0039* (2013.01); *H02P 21/05* (2013.01); *H02P 21/06* (2013.01); *H02P 27/08* (2013.01)

(58) Field of Classification Search
CPC ............... H02P 21/0035; H02P 21/06; H02M 2001/123
USPC ....................................... 318/400.02
See application file for complete search history.

(56) References Cited

U.S. PATENT DOCUMENTS

| 5,481,451 A | 1/1996 | Kuwahara | |
| 7,164,254 B2* | 1/2007 | Kerkman et al. | ............. 318/812 |
| 2007/0268051 A1* | 11/2007 | Kerkman et al. | ............. 327/175 |
| 2008/0129238 A1* | 6/2008 | Andersen | ...................... 318/565 |

(Continued)

FOREIGN PATENT DOCUMENTS

| JP | 1-91667 A | 4/1989 |
| JP | 6-153534 A | 5/1994 |

(Continued)

*Primary Examiner* — Erick Glass
(74) *Attorney, Agent, or Firm* — Birch, Stewart, Kolasch & Birch, LLP (57) ABSTRACT

In a power converter, vibration and noise of a motor due to pulsation of a direct current link voltage are reduced. An inverter circuit is provided, which is configured to convert a direct current link voltage having a pulsating component to an alternating current to output the alternating current to a permanent magnet synchronous motor. A controller is provided, which is configured to control the inverter circuit by vector control and which, in a control state in which fundamental voltage vectors do not include a zero vector (voltage vector for which a motor terminal voltage is zero), performs such control that the phase of a resultant voltage vector of a d-axis voltage vector and a q-axis voltage vector of the permanent magnet synchronous motor varies depending on pulsation.

20 Claims, 7 Drawing Sheets

(56) References Cited

U.S. PATENT DOCUMENTS

| | | |
|---|---|---|
| 2010/0066283 A1* | 3/2010 | Kitanaka .................. 318/400.02 |
| 2011/0227515 A1* | 9/2011 | Imura ...................... 318/400.01 |
| 2014/0062359 A1* | 3/2014 | Oyobe et al. ............. 318/400.13 |
| 2014/0225536 A1* | 8/2014 | Yamada et al. ................. 318/51 |

FOREIGN PATENT DOCUMENTS

| | | |
|---|---|---|
| JP | 2002-51589 A | 2/2002 |
| JP | 2002-223599 A | 8/2002 |
| JP | 2005-130666 A | 5/2005 |
| JP | 2009-273193 A | 11/2009 |

* cited by examiner

OVER-MODULATION CONTROL AREA

POWER CONVERTER

TECHNICAL FIELD

The present disclosure relates to a power converter configured to convert, by switching, an input to an alternating current output with a predetermined frequency and a predetermined voltage.

BACKGROUND ART

Conventionally, a power converter including an inverter circuit has been known. The inverter circuit is configured to convert, by switching control, a direct current power to an alternating current power having a variable frequency and a variable voltage with high efficiency.

Examples of the power converter of this type include a so-called "electrolytic capacitor-less inverter circuit" using a low-capacity smoothing capacitor for a direct current link (see, e.g., Patent Document 1). In the electrolytic capacitor-less inverter circuit, e.g., a smoothing capacitor having a low capacity of about several hundred microfarads is provided on an output side of a diode rectifier circuit, instead of providing a conventional high-capacity smoothing capacitor (electrolytic capacitor). In the electrolytic capacitor-less inverter circuit to which a three-phase full-wave rectified alternating current is input, failure of a motor, such as vibration and noise, occurs in a control state (hereinafter referred to as an "over-modulation state") in which a direct current link voltage pulsates with a frequency six times the frequency of a power supply (i.e., the frequency of a three-phase alternating current) and a fundamental voltage vector does not include a zero vector (i.e., a voltage vector for which a motor terminal voltage is zero). Typically, over-modulation control is not performed in a three-phase electrolytic capacitor-less inverter, resulting in a decrease in rate of voltage utilization and an increase in device loss in the three-phase electrolytic capacitor-less inverter.

CITATION LIST

Patent Document

PATENT DOCUMENT 1: Japanese Unexamined Patent Publication No. 2002-051589

SUMMARY OF THE INVENTION

Technical Problem

The present disclosure has been made in view of the foregoing, and aims to, in a power converter configured to convert, by switching, a pulsating direct current into an alternating current output with a predetermined frequency and a predetermined voltage to output the alternating current output to a permanent magnet synchronous motor, reduce vibration and noise of a motor due to pulsation of a direct current link voltage even in an over-modulation state and to reduce or prevent a decrease in rate of voltage utilization and an increase in device loss in a three-phase electrolytic capacitor-less inverter.

Solution to the Problem

In order to accomplish the foregoing, a first aspect of the invention is intended for a power converter including an inverter circuit (4) configured to convert, by switching, a direct current link voltage (vdc) having a pulsating component to an alternating current output having a predetermined frequency and a predetermined voltage to output the alternating current output to a permanent magnet synchronous motor (7); and a controller (5) configured to control the inverter circuit (4) by vector control for combining fundamental voltage vectors to control the switching, and, in a control state in which the fundamental voltage vectors do not include a zero vector which is a voltage vector for which a motor terminal voltage is zero, perform such control that a phase of a resultant voltage vector (V0) from a q-axis varies depending on the pulsating component, the resultant voltage vector (V0) being a resultant voltage vector of a d-axis voltage vector and a q-axis voltage vector of the permanent magnet synchronous motor (7).

In this configuration, the phase of a fundamental wave component of the output of the inverter circuit (4) changes depending on the pulsating component in an over-modulation state. Thus, influence of pulsation of a direct current link voltage of the inverter circuit (4) is reduced, and such reduction allows over-modulation control. Consequently, a decrease in rate of voltage utilization and an increase in device loss can be reduced or prevented.

A second aspect of the invention is intended for the power converter of the first aspect of the invention, in which the controller (5) adjusts a phase of a wave with the varying phase of the resultant voltage vector (V0) from the q-axis depending on one or both of a reference correlating a torque of the permanent magnet synchronous motor (7) and a rotational speed of the permanent magnet synchronous motor (7).

In this configuration, the phase of the waveform with the varying phase of the resultant voltage vector (V0) from the q-axis is adjusted depending on the reference correlating the torque and/or the rotational speed.

A third aspect of the invention is intended for the power converter of the first or second aspect of the invention, in which the controller (5) controls the inverter circuit (4) to output a three-phase alternating current whose continuous conduction interval corresponds to a phase of 180 degrees.

In this configuration, in an inverter circuit (e.g., a so-called "six-step inverter") configured to output a three-phase alternating current whose conduction interval corresponds to 180 degrees of each phase, influence of disadvantages such as pulsation of an output current can be reduced, as well as improving the rate of voltage utilization and reducing device loss.

A fourth aspect of the invention is intended for the power converter of the first aspect of the invention, in which, when the controller (5) controls the inverter circuit (4) to output a phase voltage whose conduction interval corresponds to a phase of 180 degrees, the controller (5) controls the inverter circuit (4) to output a pulse voltage with a carrier cycle to reduce or prevent a voltage error occurring at phase voltage switching timing every 180 degrees of the phase.

In this configuration, the output voltage of the inverter circuit (4) can be adjusted using the pulse voltage superimposed thereon.

A fifth aspect of the invention is intended for the power converter of any one of the first to fourth aspects of the invention, in which the controller (5) changes a phase of a fundamental wave component such that an effective value for output current of the inverter circuit (4) decreases.

In this configuration, the phase of the fundamental wave component is changed using the effective value for output current as a reference.

A sixth aspect of the invention is intended for the power converter of any one of the first to fourth aspects of the invention, in which the controller (5) changes a phase of a fundamental wave component such that an effective value for fundamental wave component of an output current of the inverter circuit (4) decreases.

In this configuration, the phase of the fundamental wave component is changed using the effective value for fundamental wave component of the output current as a reference.

A seventh aspect of the invention is intended for the power converter of any one of the first to fourth aspects of the invention, in which the controller (5) changes a phase of a fundamental wave component such that a peak value for output current of the inverter circuit (4) decreases.

In this configuration, the phase of the fundamental wave component is changed using the peak value for output current as a reference.

An eighth aspect of the invention is intended for the power converter of any one of the first to fourth aspects of the invention, in which the controller (5) changes a phase of a fundamental wave component such that a change in obtained torque of the permanent magnet synchronous motor (7) decreases.

In this configuration, the phase of the fundamental wave component is changed using the torque of the permanent magnet synchronous motor (7) as a reference.

A ninth aspect of the invention is intended for the power converter of any one of the first to fourth aspects of the invention, in which the controller (5) changes a phase of a fundamental wave component such that a power factor of the permanent magnet synchronous motor (7) is improved.

In this configuration, the phase of the fundamental wave component is changed using the output power factor of the permanent magnet synchronous motor (7) as a reference.

A tenth aspect of the invention is intended for the power converter of any one of the first to fourth aspects of the invention, which further includes a direct current supply (2, 3) configured to convert an input alternating current to a pulsating direct current to supply the direct current to the inverter circuit (4). The controller (5) changes a phase of a fundamental wave component such that an amplitude of a harmonic of the current input to the direct current supply (2, 3) decreases.

In this configuration, the phase of the fundamental wave component is changed using the harmonic of the current input to the direct current supply (2, 3) as a reference.

Advantages of the Invention

According to the first aspect of the invention, since pulsation of the output current of the inverter circuit (4) can be reduced, failure caused due to pulsation of the direct current link voltage can be reduced, and such reduction allows overmodulation control.

According to the second aspect of the invention, the advantage of the first aspect of the invention can be more effectively realized.

According to the third aspect of the invention, in the so-called "six-step inverter," the rate of voltage utilization can be improved, and device loss can be reduced.

According to the fourth aspect of the invention, the output voltage of the inverter circuit (4) can be more accurately controlled.

According to the fifth to tenth aspects of the invention, the change in phase of the fundamental wave component is determined based on the reference, thereby reducing failure caused due to pulsation of the direct current link voltage of the inverter circuit (4).

DESCRIPTION OF EMBODIMENTS

Embodiments of the present disclosure will be described below with reference to drawings. Note that the embodiments described below will be set forth merely for the purpose of preferred examples in nature, and are not intended to limit the scope, applications, use of the invention.

<<First Embodiment of the Invention>>
<Entire Configuration>

Figure 1:
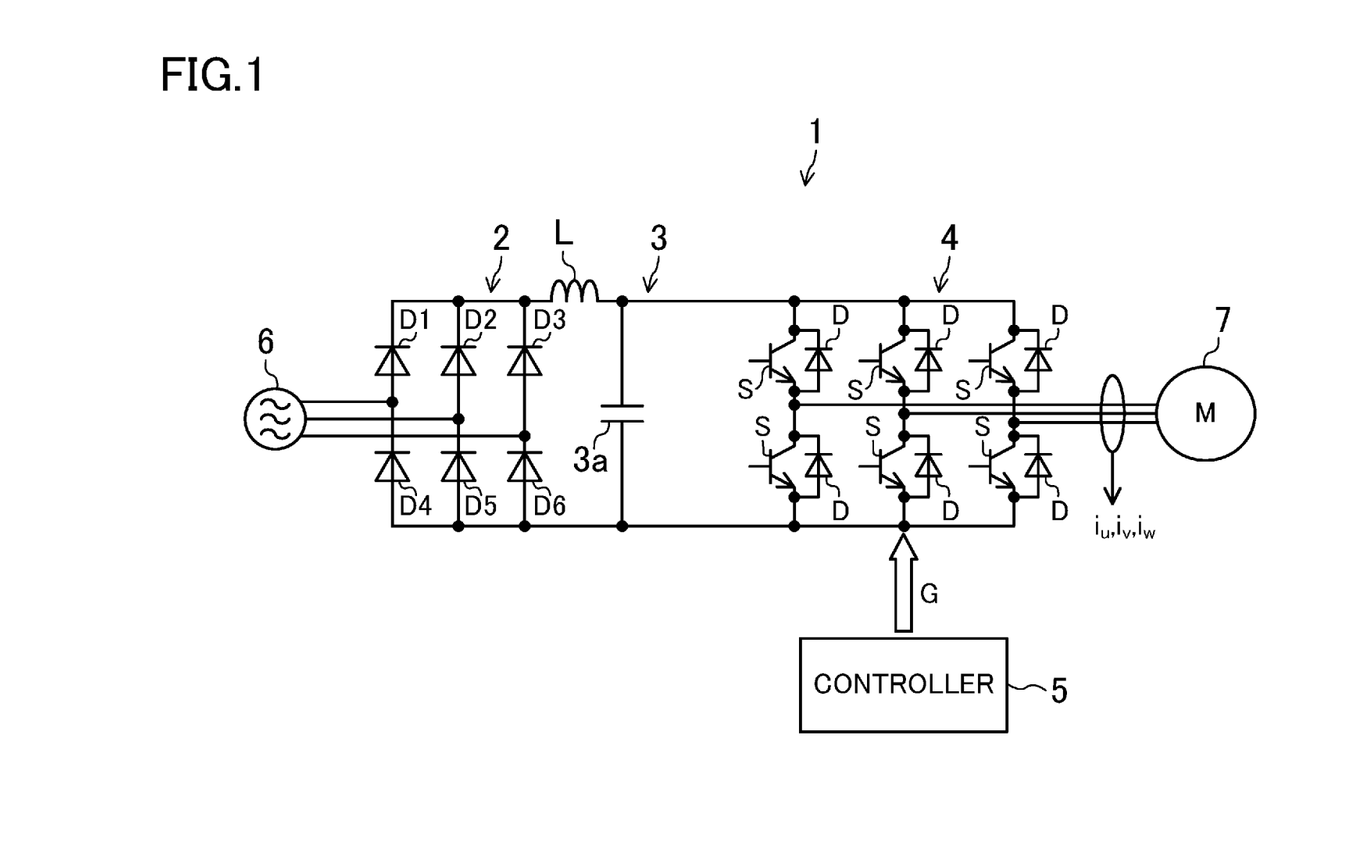
FIG. 1 is a block diagram illustrating the configuration of a power converter of a first embodiment of the present disclosure.

FIG. 1 is a block diagram illustrating the configuration of a power converter (1) of a first embodiment of the present disclosure. Referring to FIG. 1, the power converter (1) includes a converter circuit (2), a direct current link (3), an inverter circuit (4), and a controller (5). The power converter (1) is configured to convert an alternating current power supplied from a three-phase alternating current power supply (6) to a power having a predetermined frequency to supply the converted power to a motor (7). Note that the motor (7) of the present embodiment is a permanent magnet synchronous motor. More specifically, the motor (7) of the present embodiment is an interior permanent magnet motor (hereinafter sometimes referred to as an "IPM motor"). The motor (7) is configured to drive, e.g., a compressor provided in a refrigerant circuit of an air conditioner.

<Converter Circuit (2)>

The converter circuit (2) is connected to the three-phase alternating current power supply (6), and is configured to perform full-wave rectification of a three-phase alternating current output from the three-phase alternating current power supply (6). In this example, the converter circuit (2) is a diode bridge circuit in which a plurality of diodes (D1-D6) (six diodes in the present embodiment) are connected together in a bridge-like manner.

<Direct Current Link (3)>

The direct current link (3) includes a capacitor (3a). The capacitor (3a) is connected in parallel with an output node of the converter circuit (2) through a reactor (L). Moreover, the capacitor (3a) is connected between input nodes of the inverter circuit (4), and a direct current voltage (direct current link voltage (vdc)) generated at both ends of the capacitor (3a) is applied to the inverter circuit (4).

The capacitor (3a) has such a capacitance that only voltage rippling (voltage fluctuation) generated corresponding to a switching frequency can be smoothed upon switching of switching devices (described later) of the inverter circuit (4). That is, the capacitor (3a) is a low-capacity capacitor which does not have such a capacitance that a voltage rectified by the converter circuit (2) (i.e., voltage fluctuation due to a power supply voltage) is smoothed. The capacitor (3a) is, e.g., a film capacitor.

Since the capacitor (3a) has the capacitance as described above, the direct current link voltage (vdc) output from the direct current link (3) has a pulsating component. Since the alternating current power supply (6) is a three-phase alternating current power supply, the direct current link voltage (vdc) pulsates with a frequency six times a power supply frequency (e.g., 50 Hz). The direct current link (3) and the converter circuit (2) form one example of a direct current supply (2, 3) of the present disclosure.

<Inverter Circuit (4)>

The inverter circuit (4) is configured to convert, by switching, the output of the direct current link (3) to a three-phase alternating current to supply the three-phase alternating current to the motor (7) connected to the inverter circuit (4). In the inverter circuit (4), the plurality of switching devices are connected together in a bridge-like manner. The switching devices (S) are insulated-gate bipolar transistors (IGBTs). Needless to say, the switching devices (S) may be other types of semiconductor devices, such as field effect transistors (FETs).

Since the inverter circuit (4) outputs a three-phase alternating current to the motor (7), the inverter circuit (4) includes six switching devices (S). Specifically, the inverter circuit (4) includes three switching legs each connecting two of the switching devices (S) in series. Each switching leg is, at a middle point between the switching device (S) of an upper arm and the switching device (S) of a lower arm, connected to a coil (not shown in the figure) of the motor (7) for a corresponding one of phases.

A free-wheel diode (D) is connected in reverse parallel with each switching device (S). The inverter circuit (4) switches ON/OFF of the switching devices (S) to convert the direct current link voltage (vdc) input from the direct current link (3) to a three-phase alternating current voltage. Note that the controller (5) controls ON/OFF of the switching devices (S).

<Controller (5)>

The controller (5) includes a microcomputer and a program for operating the microcomputer. The controller (5) is configured to properly switch between a pulse width modulation (PWM) control mode and an over-modulation control mode (described later) to control switching of the switching devices (S). The over-modulation control mode is selected when an attempt is made to increase the amplitude of a primary component (also called as a "fundamental wave component") of an output of the inverter circuit (4) beyond that of the direct current link voltage (vdc).

Figure 2:
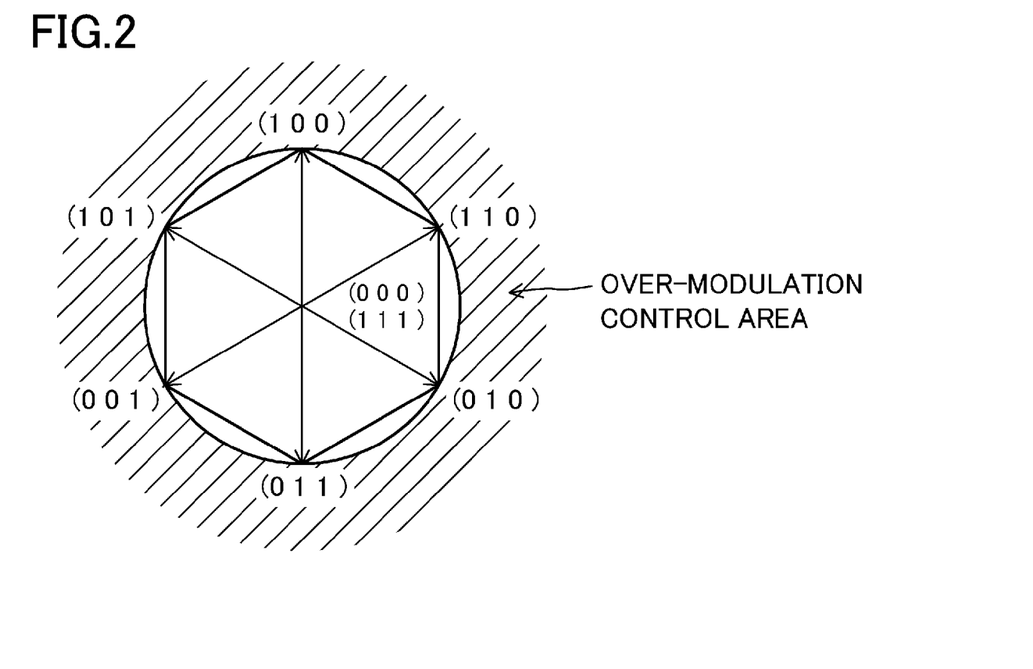
FIG. 2 is an output space vector modulation diagram of an inverter circuit.

The controller (5) controls, using vector control, switching in the inverter circuit (4). FIG. 2 is an output space vector modulation diagram of the inverter circuit (4). FIG. 2 illustrates fundamental voltage vectors of an inverter circuit configured to output a three-phase alternating current. Each fundamental voltage vector indicates which one of the switching devices (S) of the upper arm is ON. For example, a vector (100) indicates that only the U-phase switching device (S) is ON at the upper arm. In a PWM control mode of a three-phase inverter circuit, eight switching states corresponding respectively to the total of eight fundamental voltage vectors, i.e., six fundamental voltage vectors each pointing to a corresponding one of vertexes of a hexagonal shape of FIG. 2 and two zero vectors (000), (111) having zero magnitude, are switched such that an alternating current having a desired voltage and a desired phase is output.

On the other hand, the over-modulation control mode of the present embodiment is a mode for controlling, over a single cycle of a carrier signal, the output of the inverter circuit (4) so as not to show an all-phase HIGH pattern or an all-phase LOW pattern. The over-modulation control mode corresponds to a shaded area illustrated in FIG. 2. In the over-modulation control mode, predetermined ones of the switching devices (S) is fixed at an ON state or an OFF state over a series of several carrier cycles. Thus, the amplitude of the fundamental wave component can be higher than that in the PWM control mode.

In the over-modulation control mode, the controller (5) controls the inverter circuit (4) based on the following.

Figure 3:
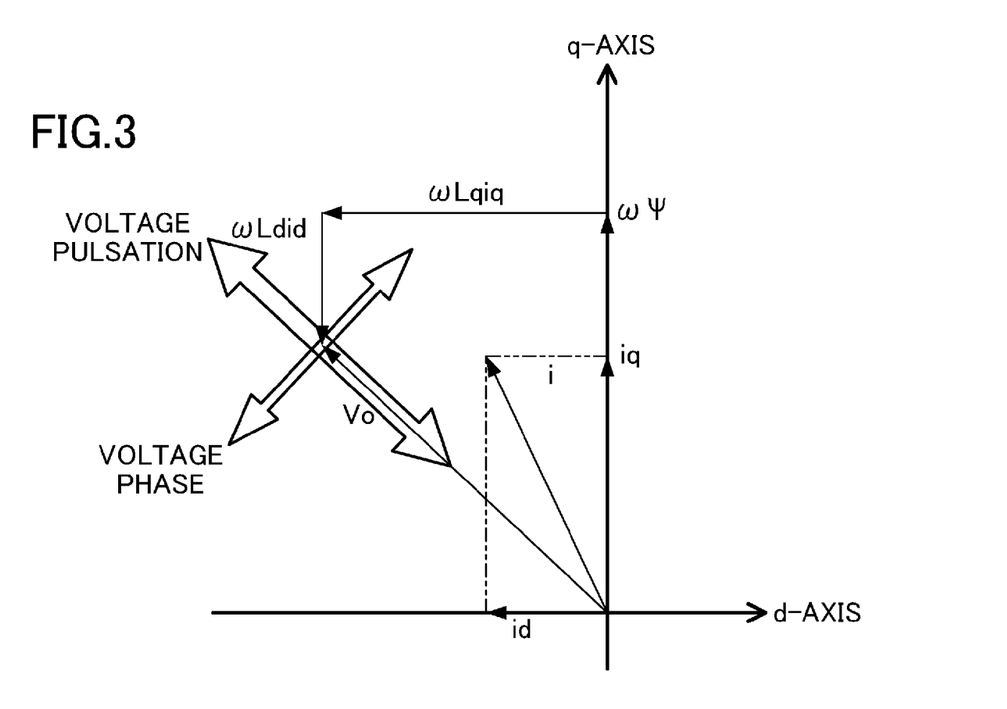
FIG. 3 is a graph showing a relationship among vectors of a voltage equation.

An expression described below is a voltage equation of the IPM motor. Moreover, FIG. 3 is a graph showing a relationship among vectors of the voltage equation.

$$v_d = (R_a + pL_d) \cdot i_d - \omega L_q \cdot i_q$$

$$v_q = (R_a + pL_q) \cdot i_q - \omega L_d \cdot i_d + \omega \Psi_a \quad \text{[First Expression]}$$

$\Psi_a$: INTERLINKAGE MAGNETIC FLUX BY PERMANENT MAGNET
$v_d$, $v_q$: d-AXIS AND q-AXIS VOLTAGES OF MOTOR
$i_d$, $i_q$: d-AXIS AND q-AXIS CURRENTS OF MOTOR
$L_d$, $L_q$: d-AXIS AND q-AXIS INDUCTANCES OF MOTOR
$R_a$: RESISTANCE OF COIL AROUND ARMATURE OF MOTOR

As already described, the direct current link voltage (vdc) pulsates with the frequency six times the frequency of the output voltage of the three-phase alternating current power supply (6). As will be seen from the voltage equation, the magnitude of the output voltage of the inverter circuit (4) varies with the frequency six times the frequency of the output voltage of the three-phase alternating current power supply (6). The voltage to be applied to the motor (7) is represented by $\sqrt{(vd^2 + vq^2)}$, where a d-axis voltage is vd and a q-axis voltage is vq. Due to pulsation of the voltage applied to the motor (7), a d-axis current (id) and a q-axis current (iq) also pulsate. Pulsation of the d-axis current (id) and the q-axis current (iq) result in output torque variation of the motor (7) and an increase in output current effective value.

Thus, in the over-modulation control mode, the controller (5) performs, depending on pulsation of the direct current link voltage (vdc), control for changing (varying) the phase (arctan (vd/vq)) of a resultant voltage vector (V0) from a q-axis. The resultant voltage vector (v0) is a resultant voltage vector of two voltage vectors of the motor (7), i.e., the resultant voltage vector of a d-axis voltage vector and a q-axis voltage vector of the motor (7). The phase of the resultant voltage vector (V0) is hereinafter sometimes simply referred to as a "voltage phase." For the resultant voltage vector (V0) described herein, the fundamental wave component is taken into consideration. The direction of the N-pole of a magnet of a rotor of the motor (7) is defined as a d-axis, and the direction advanced from the d-axis by π/2 is defined as the q-axis. Currents and voltages (u, v, w) of stators (coils) of the motor (7) are converted depending on the position (θ) of the rotor, thereby obtaining the d-axis current, the q-axis current, the d-axis voltage, and the q-axis voltage.

Figure 4:
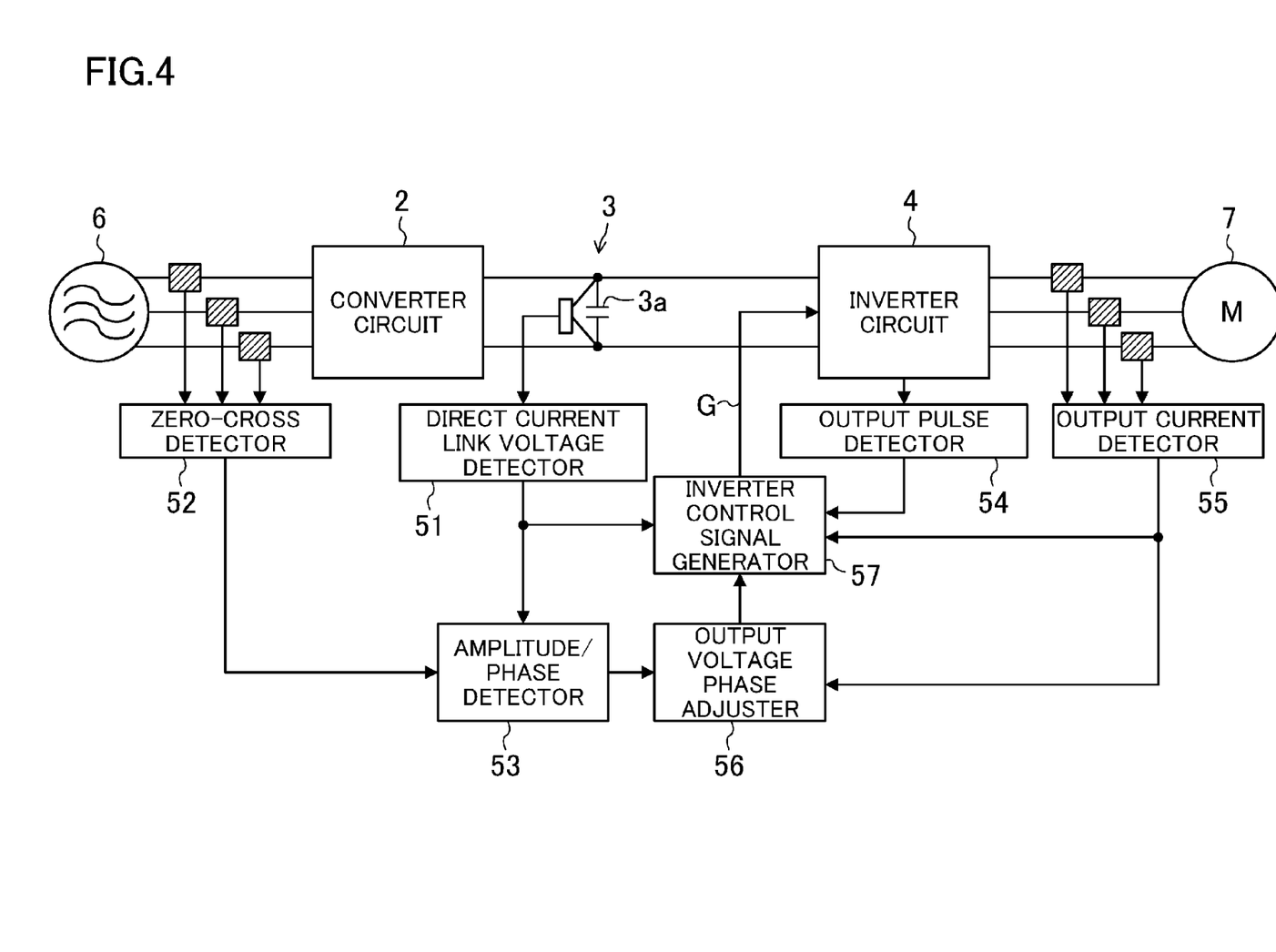
FIG. 4 is a block diagram illustrating the configuration of a controller of the first embodiment.

FIG. 4 is a block diagram illustrating the configuration of the controller (5) of the first embodiment. Referring to FIG. 4, the controller (5) includes a direct current link voltage detector (51), a zero-cross detector (52), an amplitude/phase detector (53), an output pulse detector (54), an output current detector (55), an output voltage phase adjuster (56), and an inverter control signal generator (57).

Direct Current Link Voltage Detector (51) and Zero-Cross Detector (52)

The direct current link voltage detector (51) is configured to detect the direct current link voltage (vdc) to output a detection result to the amplitude/phase detector (53) and the inverter control signal generator (57). The zero-cross detector (52) is configured to detect timing (i.e., a zero-cross point) at which a line voltage of the three-phase alternating current power supply (6) reaches zero to output a detection result to the amplitude/phase detector (53).

Amplitude/Phase Detector (53)

The amplitude/phase detector (53) is configured to calculate the phase and amplitude of an alternating current component contained in the direct current link voltage (vdc). The alternating current component of the direct current link voltage (vdc) has a frequency six times the frequency of the voltage (power supply voltage) of the three-phase alternating current power supply (6), and there is a correlation between the phase of the power supply voltage and the phase of the alternating current component of the direct current link voltage (vdc). Thus, the amplitude/phase detector (53) obtains the phase of the alternating current component of the direct current link voltage (vdc) based on the zero-cross detection result obtained by the zero-cross detector (52).

The amplitude of the alternating current component contained in the direct current link voltage (vdc) is calculated based on the direct current link voltage (vdc) detected by the direct current link voltage detector (51) and the zero-cross detection result.

Output Pulse Detector (54)

The output pulse detector (54) is configured to detect the pulse width of the voltage (i.e., the phase voltage (vu, vv, vw)) of each phase (U-phase, V-phase, W-phase) of the inverter circuit (4) to output detection results to the inverter control signal generator (57).

Output Current Detector (55)

The output current detector (55) is configured to detect the current (iu, iv, iw) of each phase (U-phase, V-phase, W-phase) of the inverter circuit (4) and convert detection values to the d-axis current (id) and the q-axis current (iq) of the motor (7) to output the d-axis current (id) and the q-axis current (iq) to the output voltage phase adjuster (56) and the inverter control signal generator (57).

Output Voltage Phase Adjuster (56)

The output voltage phase adjuster (56) is configured to change (vary) the voltage phase in association with pulsation of the direct current link voltage (vdc) such that an effective value (hereinafter referred to as an "output current effective value") for each of the d-axis current (id) and the q-axis current (iq) (i.e., the output current of the inverter circuit (4)) decreases in the over-modulation control mode. That is, in the over-modulation control mode, the voltage phase is advanced or delayed in association with pulsation of the direct current link voltage (vdc). For example, the current (iu, iv, iw) increases when the voltage phase is advanced, whereas the current (iu, iv, iw) decreases when the voltage phase is delayed.

The output current effective value is represented by $\sqrt{(id^2+iq^2)}$. The values obtained by the output current detector (55) can be used as the values for d-axis current (id) and q-axis current (iq) to calculate the output current effective values. In the present embodiment, the controller (5) performs feedback control to seek for the range of change in voltage phase when an attempt is made to change the voltage phase.

Inverter Control Signal Generator (57)

The inverter control signal generator (57) is configured to receive the output of the direct current link voltage detector (51) and the output of the output pulse detector (54) to generate, based on such outputs, a gate signal (G) for driving each switching device (S) of the inverter circuit (4). For example, in the over-modulation control mode, the inverter control signal generator (57) obtains timing for turning ON or OFF each switching device (S) such that the voltage phase changes with the amplitude obtained by the output voltage phase adjuster (56), and then generates the gate signal (G) for such a switching device (S).

<Operation of Power Converter (1)>

Operation of the power converter (1) in the PWM control mode is similar to that of a typical inverter circuit. On the other hand, in the over-modulation control mode, the phase and amplitude of the alternating current component contained in the direct current link voltage (vdc) are obtained in the amplitude/phase detector (53). Moreover, in the output voltage phase adjuster (56), the output current effective values are obtained, and another amplitude of the voltage phase is obtained such that the output current effective values decrease. The inverter control signal generator (57) controls switching of the inverter circuit (4) such that the voltage phase changes with the another amplitude in accordance with pulsation of the direct current link voltage (vdc).

Figure 5:
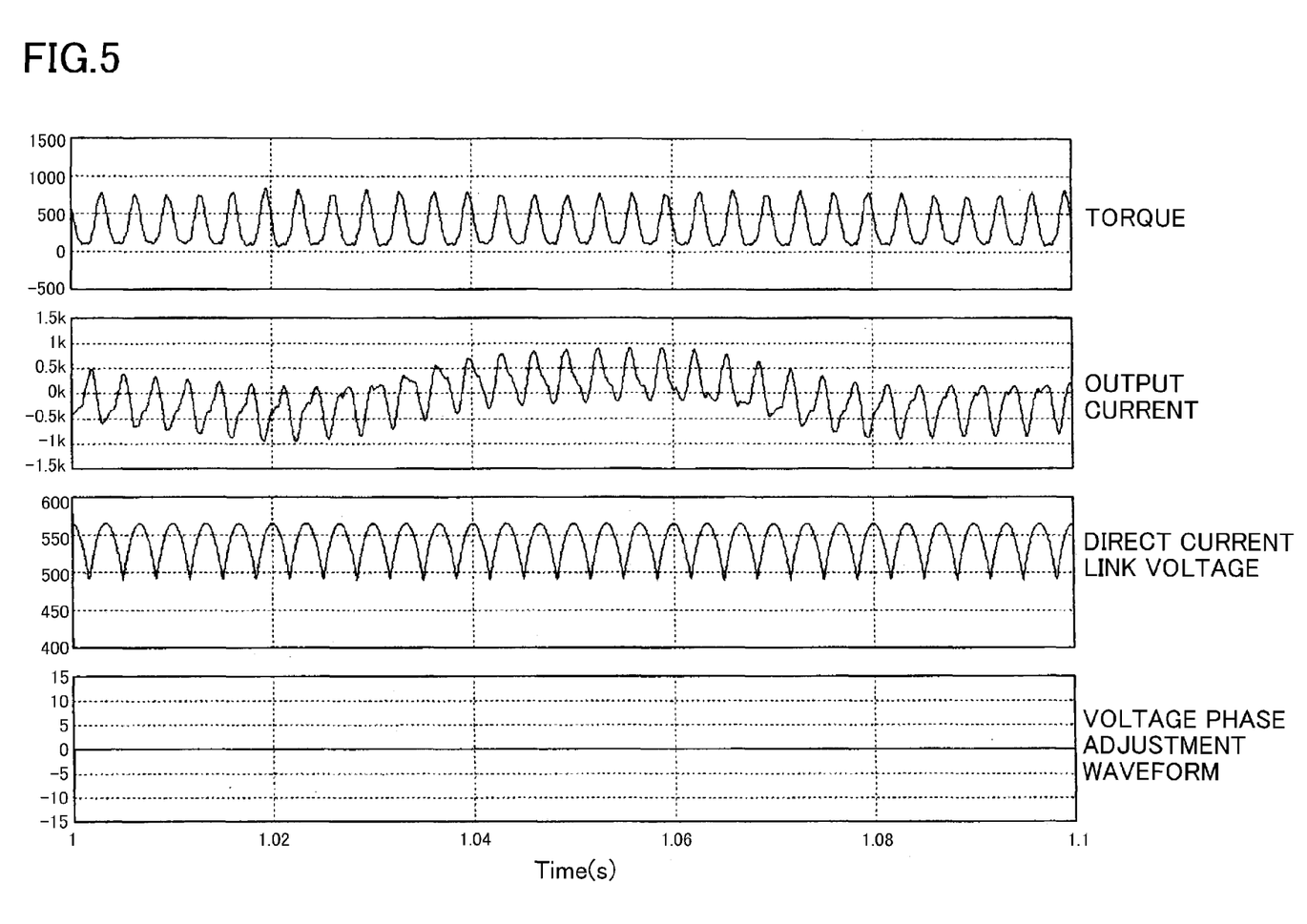
FIG. 5 is a diagram illustrating the waveforms of an output current etc. when a motor is driven without a voltage phase being adjusted by an output voltage phase adjuster.

FIG. 5 is a diagram illustrating the waveforms of an output current etc. when the motor (7) is driven without the voltage phase being adjusted by the output voltage phase adjuster (56). A "voltage phase adjustment waveform" illustrated in FIG. 5 indicates a control state of pulsation of the voltage phase by the output voltage phase adjuster (56). In this example, the voltage phase adjustment waveform is flat, and indicates that no voltage phase adjustment is performed by the output voltage phase adjuster (56). When the voltage phase does not change (vary) as just described, an output current waveform is modulated to have great curvature.

Figure 6:
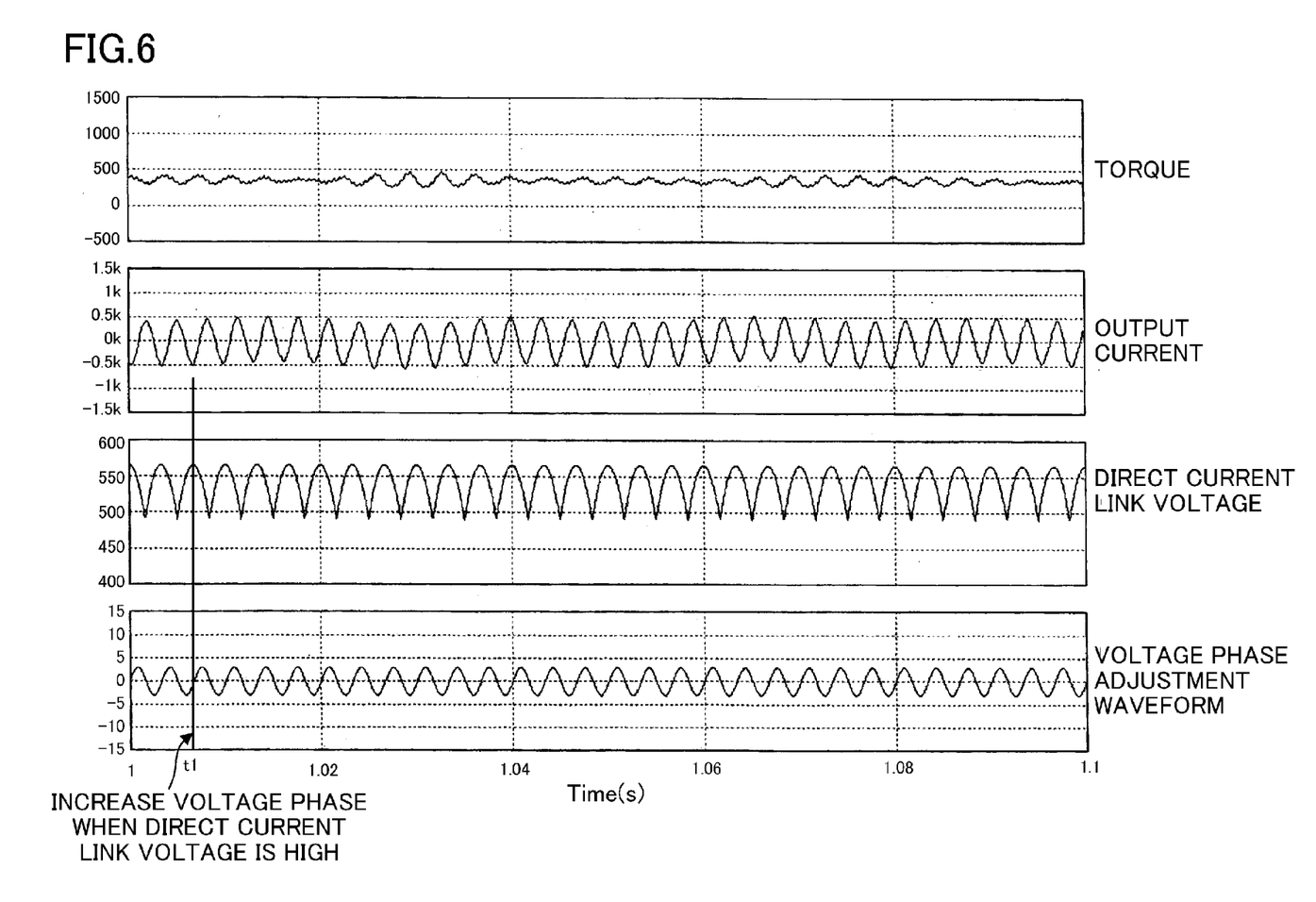
FIG. 6 is a diagram illustrating the waveforms of an output current etc. when the motor is driven with a voltage phase being adjusted by the output voltage phase adjuster.

On the other hand, FIG. 6 is a diagram illustrating the waveforms of an output current etc. when the motor (7) is driven with the voltage phase being adjusted by the output voltage phase adjuster (56). In this example, the voltage phase adjustment waveform is, referring to FIG. 6, undulating such that the voltage phase is advanced or delayed in accordance with pulsation of the direct current link voltage (vdc). Such pulsation of the voltage phase reduces or prevents the "curvature" of the output current waveform as illustrated in FIG. 5. In the example of FIG. 6, pulsation of the direct current link voltage (vdc) reaches the peak thereof at time (t1), and the phase of the voltage phase adjustment waveform is substantially 0° at such timing.

Figure 7:
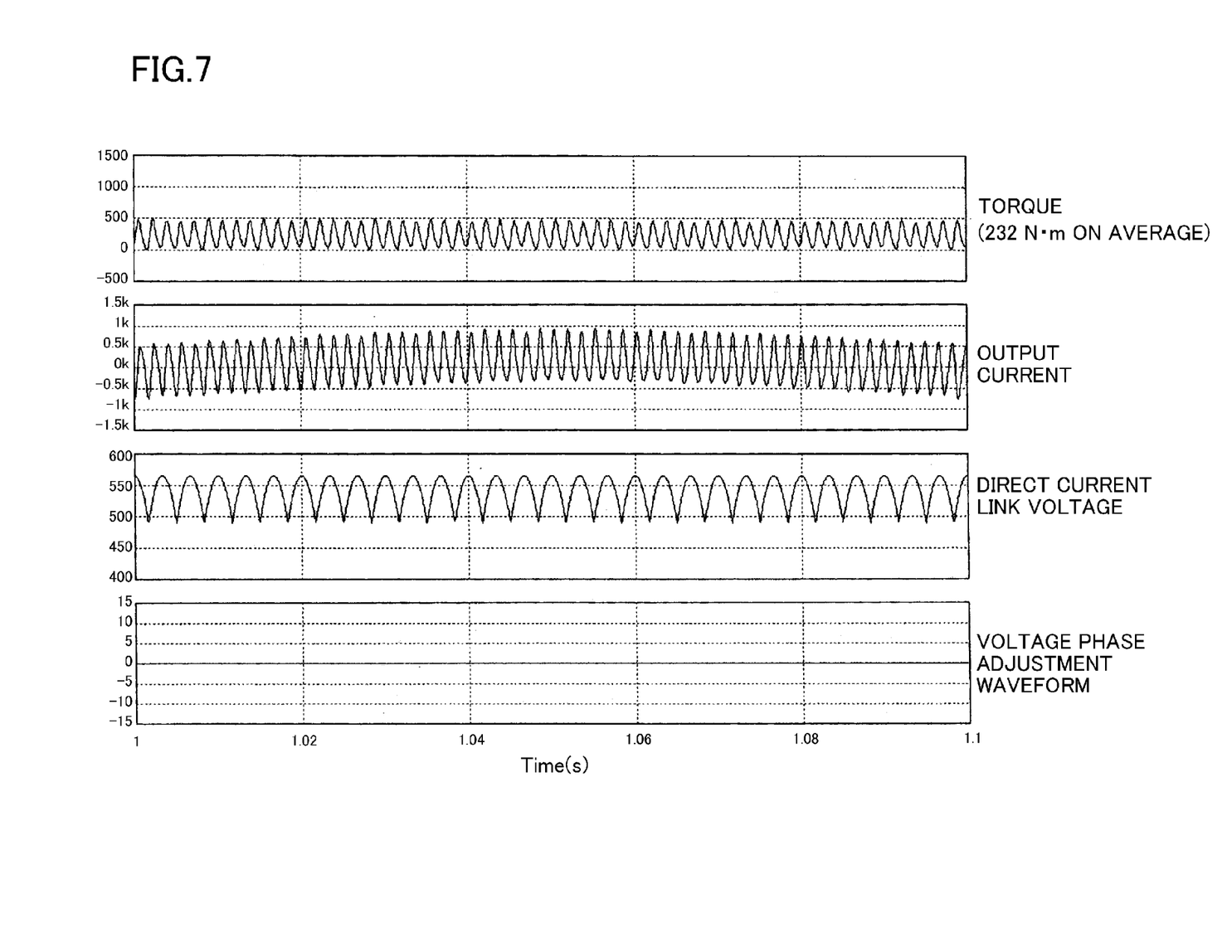
FIG. 7 is a diagram illustrating the waveforms of an output current etc. when the motor rotates at a higher speed than those of the examples of FIGS. 5 and 6 without a voltage phase being adjusted by the output voltage phase adjuster.

FIG. 7 is a diagram illustrating the waveforms of an output current etc. when the motor (7) rotates at a higher speed than those of the examples of FIGS. 5 and 6 without the voltage phase being adjusted by the output voltage phase adjuster (56). In this case, the torque of the motor (7) is lowered. In the example of FIG. 7, when the voltage phase does not change (vary) in accordance with pulsation of the direct current link voltage (vdc), the output current waveform is modulated to have great curvature.

Figure 8:
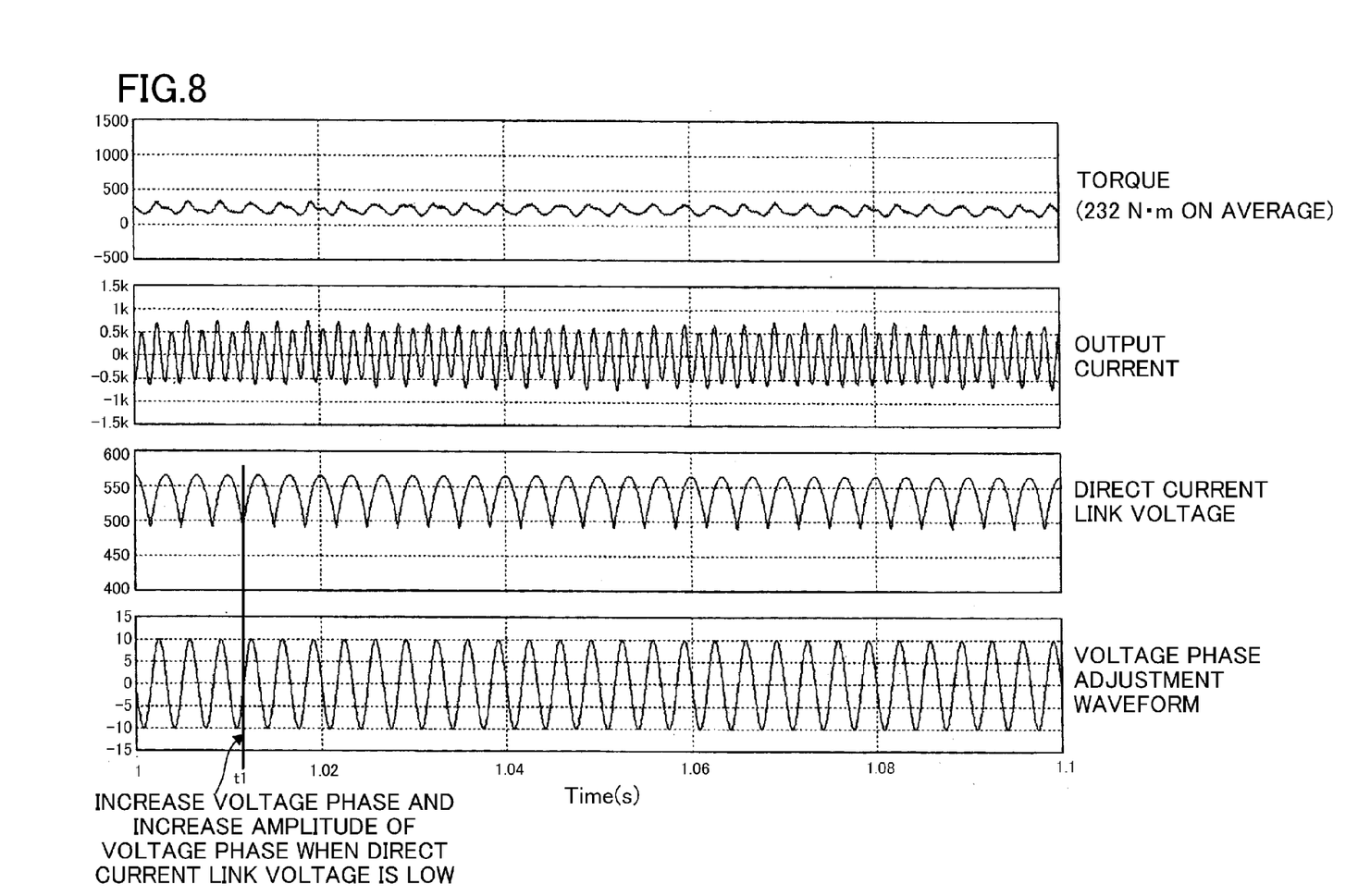
FIG. 8 is a diagram illustrating the waveforms of an output current etc. when the motor is driven at the same rotational speed as that of FIG. 7 by the same torque as that of FIG. 7 with a voltage phase being adjusted by the output voltage phase adjuster.

FIG. 8 is a diagram illustrating the waveforms of an output current etc. when the motor (7) is driven at the same rotational speed as that of FIG. 7 by the same torque as that of FIG. 7 with the voltage phase being adjusted by the output voltage phase adjuster (56). In the example of FIG. 8, the voltage phase adjustment waveform is undulating such that the voltage phase is advanced or delayed in accordance with pulsation of the direct current link voltage (vdc). Moreover, the amplitude (i.e., the range of change in phase) of the voltage phase adjustment waveform is higher than that of FIG. 6. That is, depending on the rotational speed and the torque, the amplitude of the voltage phase adjustment waveform is properly adjusted. Such change in voltage phase reduces or prevents curvature of the output current waveform (see FIGS. 7 and 8). In the example of FIG. 8, pulsation of the direct current link voltage (vdc) reaches the bottom thereof at time (t1), and the phase of the voltage phase adjustment waveform is substantially 0° at such timing. That is, the example of FIG. 8 is different from the example of FIG. 6 in the phase of the voltage phase adjustment waveform. In other words, the amplitude and phase of the voltage phase adjustment waveform are preferably adjusted depending on the change in rotational speed and torque of the motor (7).

For determination of the amplitude and phase of the voltage phase adjustment waveform, the torque of the motor (7) is not necessarily detected. A reference correlating the torque of the motor (7), such as an output current, an output voltage, or an output power, may be used. Both of the reference correlating the torque of the motor (7) and the rotational speed of the motor (7) are not necessarily used, and the amplitude and phase of the voltage phase adjustment waveform can be adjusted based on either one of the reference correlating the torque of the motor (7) or the rotational speed of the motor (7).

<Advantages of the Present Embodiment>

When the output current effective value decreases by control of the voltage phase, the amplitude of each of components, other than the output frequency, contained in the output current of the inverter circuit (4) decreases. Moreover, a smaller output current effective value results in a smaller capacity of the inverter circuit (4). Further, loss in the motor (7) can be reduced.

<First Variation of the First Embodiment>

The controller (5) may control the voltage phase such that an effective value (hereinafter sometimes referred to as an "output current fundamental wave effective value") for an extracted fundamental wave component of an output current decreases. In this manner, the capacity of the inverter circuit (4) can be reduced. Moreover, loss in the motor (7) can be reduced.

The controller (5) may control the voltage phase such that a peak value for output current decreases. Thus, the size of a power device can be reduced.

<<Second Embodiment of the Invention>>

A power converter (1) of a second embodiment controls a voltage phase using the output torque of a motor (7) as a reference, instead of using an output current as the reference.

The output torque of the motor (7) can be obtained by a cross product of a current vector (i) and an armature interlinkage magnetic flux vector. Specifically, the output torque can be represented by the following expression.

$$i \cdot \Psi \cdot \sin \phi \quad \text{[Second Expression]}$$

i: MAGNITUDE OF CURRENT VECTOR
Ψ: MAGNITUDE OF INTERLINKAGE MAGNETIC FLUX VECTOR
φ: ANGLE BETWEEN BOTH VECTORS

The power converter (1) of the present embodiment controls the voltage phase using the output torque of the motor (7) as the reference, instead of using the output current as the reference. The motor output torque is determined depending on a motor voltage, a motor current, and a motor rotational speed. Thus, if the voltage phase is controlled, the torque can be controlled. Specifically, the torque can be controlled in such a manner that feedback control is performed in an output voltage phase adjuster (56) to change the voltage phase.

<Advantages of the Present Embodiment>

As just described, the output torque of the motor (7) is controlled, thereby stabilizing the output torque. As a result, vibration and noise of the motor (7) can be reduced.

<<Third Embodiment of the Invention>>

A power converter (1) of a third embodiment controls a voltage phase using the output power factor of an inverter circuit (4) as a reference, instead of using an output current as the reference. The output power factor is determined depending on a relationship between the phase of a resultant voltage vector (V0) and the phase of a current vector (i). Thus, if the voltage phase is controlled, the output power factor can be controlled. Specifically, the output power factor can be controlled in such a manner that feedback control is performed in the output voltage phase adjuster (56) to change the voltage phase.

Improvement of the output power factor reduces the size of the inverter circuit (4) and the size of a motor (7).

<<Fourth Embodiment of the Invention>>

A current input to an inverter circuit (4) contains a harmonic component. Thus, a power converter (1) of a fourth embodiment adjusts the amplitude and timing of change in voltage phase using the level of a harmonic of the input current of the inverter circuit (4) as a reference, instead of using an output current as the reference.

Thus, influence of current harmonics on a power supply can be reduced.

<<Fifth Embodiment of the Invention>>

When an attempt is made to extract an alternating current component in an amplitude/phase detector (53), a power supply frequency should be given. However, the power supply frequency may vary according to countries. Thus, a controller (5) may count an interval between zero-cross points detected by a zero-cross detector (52) to obtain the power supply frequency.

The amplitude/phase detector (53) may estimate the phase and amplitude of the alternating current component contained in the voltage of a direct current link (3) several carrier cycles ahead. As already described, since the controller (5) includes a microcomputer, a predetermined period of time is required for computing in the microcomputer. A longer computing time may result in a greater error between the amplitude/phase of the alternating current component at actual timing of control of a voltage phase and the amplitude/phase of the alternating current component detected by the amplitude/phase detector (53). Since the amplitude/phase detector (53) is configured to estimate the phase and amplitude of the alternating current component contained in the voltage of the direct current link (3) several carrier cycles ahead, controllability of the voltage phase can be improved.

The foregoing method for detecting the phase and amplitude of the alternating current component contained in the voltage of the direct current link (3) has been set forth as an example. As another alternative, the phase and amplitude of the alternating current component may be detected in such a manner that an alternating current component is extracted from a direct current link voltage (vdc) and then timing at which such an alternating current component indicates the minimum voltage is obtained.

A combination of a plurality of methods, such as the method for obtaining an average of results obtained by multiple types of methods, may be employed as the method for detecting the phase and amplitude of the alternating current component contained in the direct current link voltage (vdc).

<<Other Embodiments>>

<1> The power converter (1) may be configured such that the inverter circuit (4) operates as a so-called "six-step inverter." The six-step inverter outputs an alternating current whose conduction interval corresponds to 180 degrees of each phase. Such control may be performed by the controller (5).

<2> If the controller (5) controls the inverter circuit (4) to output the alternating current whose conduction interval corresponds to 180 degrees of each phase, the inverter circuit (4) is preferably controlled such that a pulse voltage having a predetermined pulse width is superimposed on the output of the inverter circuit (4). For example, if the switching timing (phase) of the output of the inverter circuit (4) and the phase of a carrier signal are shifted from each other, an error may occur in an output voltage. Thus, for voltage adjustment, a pulse having a predetermined width is output from the inverter circuit (4).

<3> The IPM motor used as the motor (7) is an example. A so-called "surface permanent magnet (SPM) motor" may be used.

INDUSTRIAL APPLICABILITY

The present disclosure is useful as a power converter configured to convert, by switching, an input to an alternating current output with a predetermined frequency and a predetermined voltage.

DESCRIPTION OF REFERENCE CHARACTERS

1 Power Converter
2 Converter Circuit
3 Direct Current Link
4 Inverter Circuit
5 Controller
7 Motor (Permanent Magnet Synchronous Motor)

The invention claimed is:

1. A power converter comprising:
   a direct current supply configured to convert an input alternating current to a direct current link voltage having a pulsating component,
   an inverter circuit configured to convert, by switching, the direct current link voltage having a pulsating component received from the direct current supply, to an alternating current output having a predetermined frequency and a predetermined voltage to output the alternating current output to a permanent magnet synchronous motor; and
   a controller configured to
      control the inverter circuit by vector control for combining fundamental voltage vectors to control the switching, and
      in a control state in which the fundamental voltage vectors do not include a zero vector which is a voltage vector for which a motor terminal voltage is zero, perform such control that a phase of a resultant voltage vector from a q-axis varies depending on the pulsating component, the resultant voltage vector being a resultant voltage vector of a d-axis voltage vector and a q-axis voltage vector of the permanent magnet synchronous motor.

2. The power converter of claim 1, wherein the controller adjusts a phase of a wave with the varying phase of the resultant voltage vector from the q-axis depending on one or both of a reference correlating a torque of the permanent magnet synchronous motor and a rotational speed of the permanent magnet synchronous motor.

3. The power converter of claim 1, wherein the controller controls the inverter circuit to output a three-phase alternating current whose continuous conduction interval corresponds to a phase of 180 degrees.

4. The power converter of claim 1, wherein when the controller controls the inverter circuit to output a phase voltage whose conduction interval corresponds to a phase of 180 degrees, the controller controls the inverter circuit to output a pulse voltage with a carrier cycle to reduce or prevent a voltage error occurring at phase voltage switching timing every 180 degrees of the phase.

5. The power converter of claim 1, wherein the controller changes a phase of a fundamental wave component such that an effective value for output current of the inverter circuit decreases.

6. The power converter of claim 1, wherein the controller changes a phase of a fundamental wave component such that an effective value for fundamental wave component of an output current of the inverter circuit decreases.

7. The power converter of claim 1, wherein the controller changes a phase of a fundamental wave component such that a peak value for output current of the inverter circuit decreases.

8. The power converter of claim 1, wherein the controller changes a phase of a fundamental wave component such that a change in obtained torque of the permanent magnet synchronous motor decreases.

9. The power converter of claim 1, wherein the controller changes a phase of a fundamental wave component such that a power factor of the permanent magnet synchronous motor is improved.

10. The power converter of claim 1,
   wherein the controller changes a phase of a fundamental wave component such that an amplitude of a harmonic of the current input to the direct current supply decreases.

11. The power converter of claim 2, wherein the controller controls the inverter circuit to output a three-phase alternating current whose continuous conduction interval corresponds to a phase of 180 degrees.

12. The power converter of claim 2, wherein the controller changes a phase of a fundamental wave component such that an effective value for output current of the inverter circuit decreases.

13. The power converter of claim 11, wherein the controller changes a phase of a fundamental wave component such that an effective value for output current of the inverter circuit decreases.

14. The power converter of claim 3, wherein the controller changes a phase of a fundamental wave component such that an effective value for output current of the inverter circuit decreases.

15. The power converter of claim 4, wherein the controller changes a phase of a fundamental wave component such that an effective value for output current of the inverter circuit decreases.

16. The power converter of claim 2, wherein the controller changes a phase of a fundamental wave component such that an effective value for fundamental wave component of an output current of the inverter circuit decreases.

17. The power converter of claim 11, wherein the controller changes a phase of a fundamental wave component such that an effective value for fundamental wave component of an output current of the inverter circuit decreases.

18. The power converter of claim 3, wherein the controller changes a phase of a fundamental wave component such that an effective value for fundamental wave component of an output current of the inverter circuit decreases.

19. The power converter of claim 4, wherein the controller changes a phase of a fundamental wave component such that an effective value for fundamental wave component of an output current of the inverter circuit decreases.

20. The power converter of claim 2, wherein the controller changes a phase of a fundamental wave component such that a peak value for output current of the inverter circuit decreases.

\* \* \* \* \*